United States Patent [19]
Fujie

[11] Patent Number: 6,147,815
[45] Date of Patent: *Nov. 14, 2000

[54] IMAGING OPTICAL SYSTEM

[75] Inventor: Daijiro Fujie, Sagamihara, Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/305,598

[22] Filed: May 5, 1999

[30] Foreign Application Priority Data

May 7, 1998 [JP] Japan .................................. 10-140622

[51] Int. Cl.$^7$ ............................... G02B 3/08; G02B 5/18; G02B 9/00
[52] U.S. Cl. ........................... 359/742; 359/569; 359/754
[58] Field of Search ..................... 359/724, 742, 359/569, 754, 784, 793, 566, 558, 763, 756

[56] References Cited

U.S. PATENT DOCUMENTS

| | | | |
|---|---|---|---|
| 5,790,321 | 8/1998 | Goto | 359/742 |
| 5,930,043 | 7/1999 | Ogawa | 359/566 |
| 5,959,785 | 9/1999 | Adachi | 359/692 |

*Primary Examiner*—Georgia Epps
*Assistant Examiner*—David N. Spector

*Attorney, Agent, or Firm*—Vorys, Sater, Seymour and Pease LLP

[57] ABSTRACT

An imaging optical system (10) having a focal length (f) and a maximum imagewise numerical aperture. The system combines diffractive and refractive optical elements such that aberrations, including axial chromatic aberration, are well-corrected over a large wavelength range from the visible into the infrared. The system comprises, objectwise to imagewise along an optical axis (A), a front lens group ($G_F$) having at least one refractive optical element, a diffractive optical element (DOE) provided with a diffractive surface (D) having positive diffractive power and a focal length ($f_{DOE}$). The system also includes a rear lens group ($G_R$) having at least one refractive optical element. The system has an amount of spherical aberration at the maximum imagewise numerical aperture, is measured with respect to e-line wavelength light, in the limit as the positive diffractive power of the diffractive surface approaches zero, of RSA. The system also has a maximum amount of axial chromatic aberration of the imaging optical system over a wavelength range of 400–850 nm, as measured with respect to e-line reference wavelength light, of LA. Further, the following conditions, as well as several others, are preferably satisfied:

$$-0.01 < RSA/f < 0.01 \qquad (1)$$

$$-0.002 < LA/f < 0.002. \qquad (2)$$

19 Claims, 16 Drawing Sheets

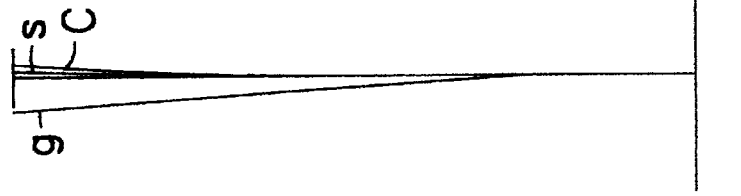
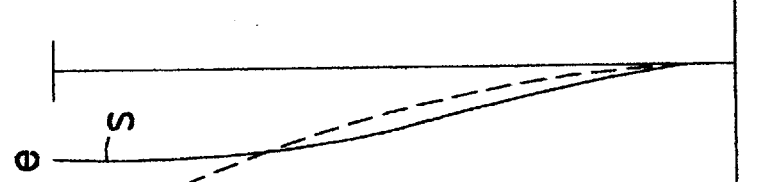

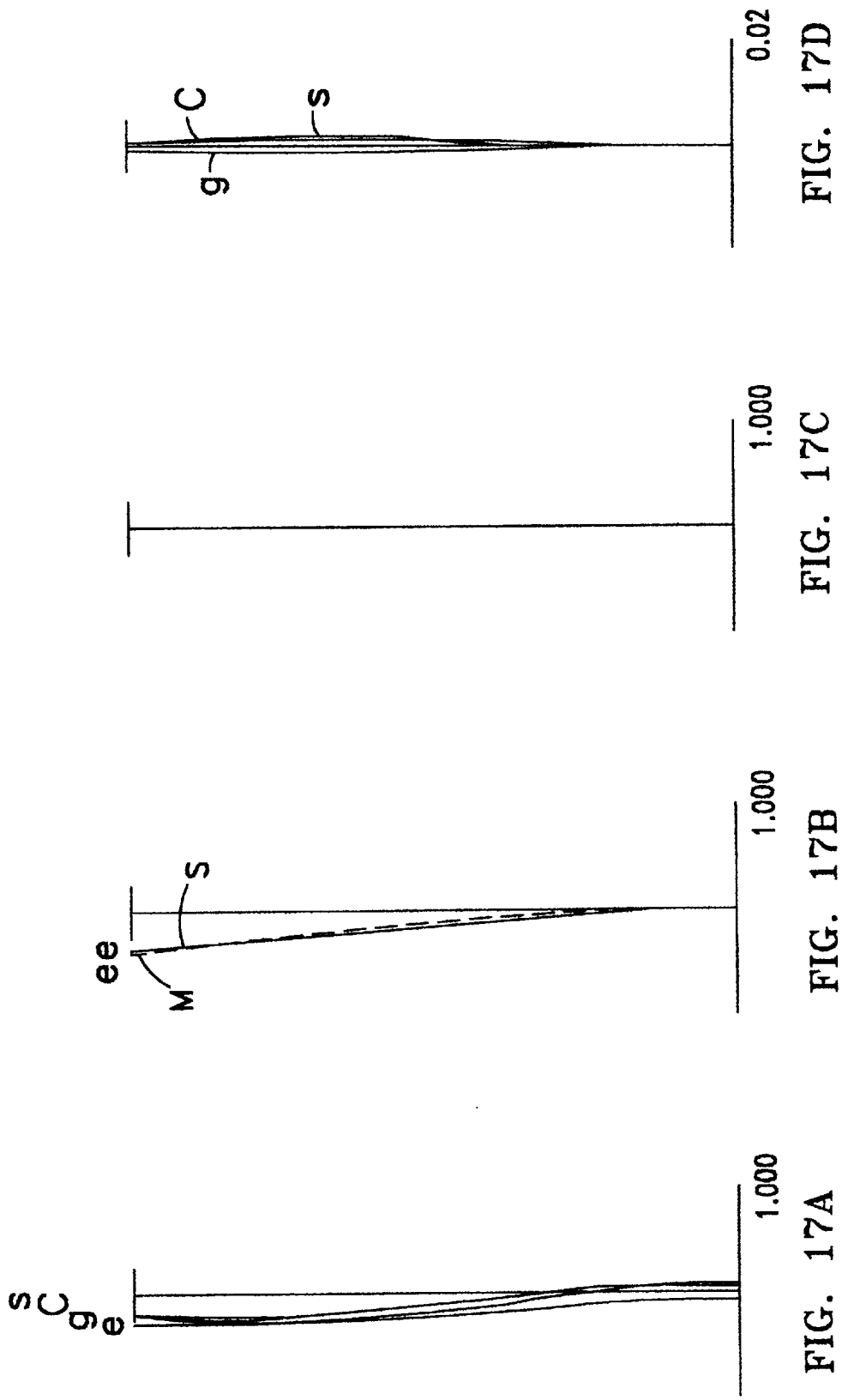

IMAGING OPTICAL SYSTEM

FIELD OF THE INVENTION

The present invention relates to an imaging optical system capable of forming an image of an object arranged at a finite distance, as in a scanner optical system, and more particularly relates to the improved correction of chromatic aberration of such imaging optical systems over a wide wavelength range extending from the visible wavelength region to the infrared wavelength region.

BACKGROUND OF THE INVENTION

An optical system for a scanner requires the ability to faithfully read the information of the original picture or object being scanned. Accordingly, it is necessary to correct various aberrations like spherical aberration for a single color, as well as to satisfactorily correct axial and transverse chromatic aberration. Axial chromatic aberration increases proportionate to the square of the imaging magnification in an optical system that forms the image of an object arranged at a finite distance, such as in an optical system for a scanner. Thus, the correction of chromatic aberration is even more critical.

Generally, it is necessary with an optical system for a scanner to faithfully reproduce the original picture or object in the visible wavelength region. However, it has also become necessary in recent years for such optical systems to be corrected for chromatic aberration over a wide wavelength range extending from the visible region to the infrared region in the vicinity of 850 nm.

Accordingly, to make such a system apochromatic (i.e., wherein chromatic aberration is corrected over a wide wavelength range), use of anomalous dispersion glass of the phosphoric acid series (e.g., phosphosilicate glass) may be considered. However, in addition to the high cost of the materials for these glasses, there is also the problem of an increase in fabrication costs due to poor workability. Also, temperature changes cause large changes in the refractive index of finished parts made from such glass as compared to ordinary glass, thereby adversely impacting imaging performance. Furthermore, since the refractive index of anomalous dispersion glass is typically low at around 1.5, the number of lenses needed to image with sufficient brightness increases, further increasing cost.

On the other hand, the application of a diffractive optical element (DOE) to an imaging optical system has been proposed for the purpose of correcting chromatic aberration. Due to the deflection of the light by diffraction, the wavelength-dispersion characteristics of a diffractive optical element differs from that of an ordinary refractive optical element. Accordingly, combining a diffractive optical element with a refractive optical element has received attention as a new aberration-correcting means.

The article entitled "The Phase Fresnel Lens," in the Journal of the Optical Society of America, Vol. 51, No. 1, 1961 ("the JOSA reference") discusses a Fresnel lens wherein the phase differential between light passing through adjacent phase rings is $2\pi$ with respect to a specified wavelength. The JOSA reference proposes that this phase Fresnel lens is effective as an aberration-correcting means, and discloses an optical system that corrects, for example, spherical aberration by arranging a phase Fresnel lens at the pupil position of the imaging optical system. The Figures show a Schmidt lens and a triplet lens as Working Examples. In addition, the JOSA reference mentions that, taking the wavelength characteristics of the phase Fresnel lens into consideration, it is effective in the correction of the secondary spectrum of a doublet lens. Also, actual design values of a collimator lens are provided. Furthermore, the JOSA reference suggests that axial chromatic aberration can be corrected over a broad wavelength range by arranging a diffractive optical element at the pupil position of the optical system.

Japanese Patent Application Kokai No. Hei 2-1109 discloses an imaging optical system having high resolving power and that corrects spherical aberration and chromatic aberration using a particular type of diffractive optical element called a binary optical element (BOE). In a binary optical element, a step-shaped surface is formed on a light transmitting member using a lithography process. This step-shape surface is capable of partially varying the optical path length. The above-cited Japanese Patent Application discloses also an imaging optical system having a high resolving power and which comprises EL refractive lens element and a transmissive grating element on which is formed a plurality of concentric circular rings. The grating element is arranged at the aperture of the optical system.

However, the invention disclosed in Japanese Patent Application Kokai No. Hei 2-1109 relates to a reduction projection lens for a stepper that uses a KrF excimer laser as the light source. The main objective of the invention is to principally correct spherical aberration to obtain a high-resolution imaging system. The spectral width of the excimer laser is approximately 0.08 nm and chromatic aberration is corrected only over this narrow range. In other words, the disclosed invention uses a limited amount of glass material to correct chromatic aberration in an extremely limited wavelength range of the ultraviolet region, rather than in a wavelength range extending from the visible region to the infrared region.

Japanese Patent Application Kokai No. Hei 8-43767 discloses a photographic optical system for the purpose of correcting the chromatic aberration of a photographic telephoto lens. To correct spot profile (convergence of the ray bundle) as well as distortion and field curvature over the entire image plane, this photographic optical system arranges a diffractive optical element objectwise of a conventional all-refractive telephoto-type optical system. This arrangement corrects characteristic chromatic aberration of the telephoto lens.

Although the invention disclosed in Japanese Patent Application Kokai No. Hei 8-43767 has the objective to correct chromatic aberration over a wide wavelength range when shooting at close range, the field-angle $2\omega$ covered is less than 15°. In addition, the imaging optical system disclosed therein arranges all diffractive optical elements most objectwise in the optical system. If an attempt is made to cover a wider field-angle with this configuration, the correction of transverse chromatic aberration becomes problematic even if axial chromatic aberration is corrected. As such, the image quality at the periphery of the field can, no longer be ensured.

SUMMARY OF THE INVENTION

The present invention relates to an imaging optical system capable of forming an image of an object arranged at a finite distance, as in a scanner optical system, and more particularly relates to the improved correction of chromatic aberration of such imaging optical systems over a wide wavelength range extending from the visible wavelength region to the infrared wavelength region.

The present invention has the goal of obtaining an imaging optical system for finite distances having a high image quality. Aberrations like chromatic aberration are satisfactorily corrected over a wide wavelength range extending from the visible region to the infrared region in the vicinity of 850 nm without making much use of anomalous dispersion glass. Moreover, the system has a field-angle of 20° or greater.

Accordingly, a first aspect of the invention is an imaging optical system having a focal length f and a maximum imagewise numerical aperture. The system (comprises, objectwise to imagewise along an optical axis, a front lens group having at least one refractive optical element, a diffractive optical element provided with a diffractive surface having positive diffractive power and a focal length $F_{DOE}$, and a rear lens group having at least one refractive optical element. A quantity RSA is the amount of spherical aberration at the maximum imagewise numerical aperture, as measured with respect to e-line wavelength light, in the limit as the positive diffractive power approaches zero. Also, LA is I maximum amount of axial chromatic aberration of the imaging optical system over a wavelength range of 400–850 nm, as measured with respect to e-line reference wavelength light. Further, the following conditions are preferably satisfied:

$$-0.01 < RSA/f < 0.01 \tag{1}$$

$$-0.002 < LA/f < 0.002. \tag{2}$$

A second aspect of the invention is an imaging optical system as described above, further satisfying the following conditions:

$$0 < LA_{Rs}/f < 0.1 \tag{3}$$

$$-0.1 < LA_{Ds}/f < 0, \tag{4}$$

wherein $LA_{Rs}$ is an amount of s-line axial chromatic aberration of the imaging optical system, as measured with respect to an e-line reference wavelength light, in the limit as the diffractive power of the diffractive surface approaches zero, $LA_{Ds} = LA_s - LA_{Rs}$, and $LA_s$ is an amount of s-line axial chromatic aberration of the imaging optical system with respect to the e-line reference.

A third aspect of the invention is an imaging optical system according as described above, satisfying the following condition:

$$10 < f_{DOE}/f < 100. \tag{5}$$

BRIEF DESCRIPTION OF THE DRAWINGS

FIGS. 7A–7D are plots of spherical aberration, astigmatism, distortion and transverse chromatic aberration, respectively, for Working Example 1 of FIG. 6;

FIGS. 17A–17D are plots of spherical aberration, astigmatism, distortion and transverse chromatic aberration, repectively, for Working Example 6 of FIG. 16.

DETAILED DESCRIPTION OF THE INVENTION

The present invention relates to an imaging optical system capable of forming an image of an object arranged at a finite distance, as in a scanner optical system, and more particularly relates to the improved correction of chromatic aberration of such imaging optical systems over a wide wavelength range extending from the visible wavelength region to the infrared wavelength region.

Due to the deflection of light by diffraction, the wavelength-dispersion characteristics of a diffractive optical element differ from that of an ordinary refractive optical element. Accordingly, as is generally known, a diffractive optical element can be used as a new aberration-correcting means. That is to say, a chromatic aberration-corrected optical system can be obtained by combining diffractive refractive optical elements. Also, as mentioned above, for an optical system imaging at finite object-distances (e.g., scanners), the correction of chromatic aberration is even more critical than for an optical system for photography used at infinity. This is because axial chromatic aberration increases proportionate to the square of the imaging magnification.

Figure 1:
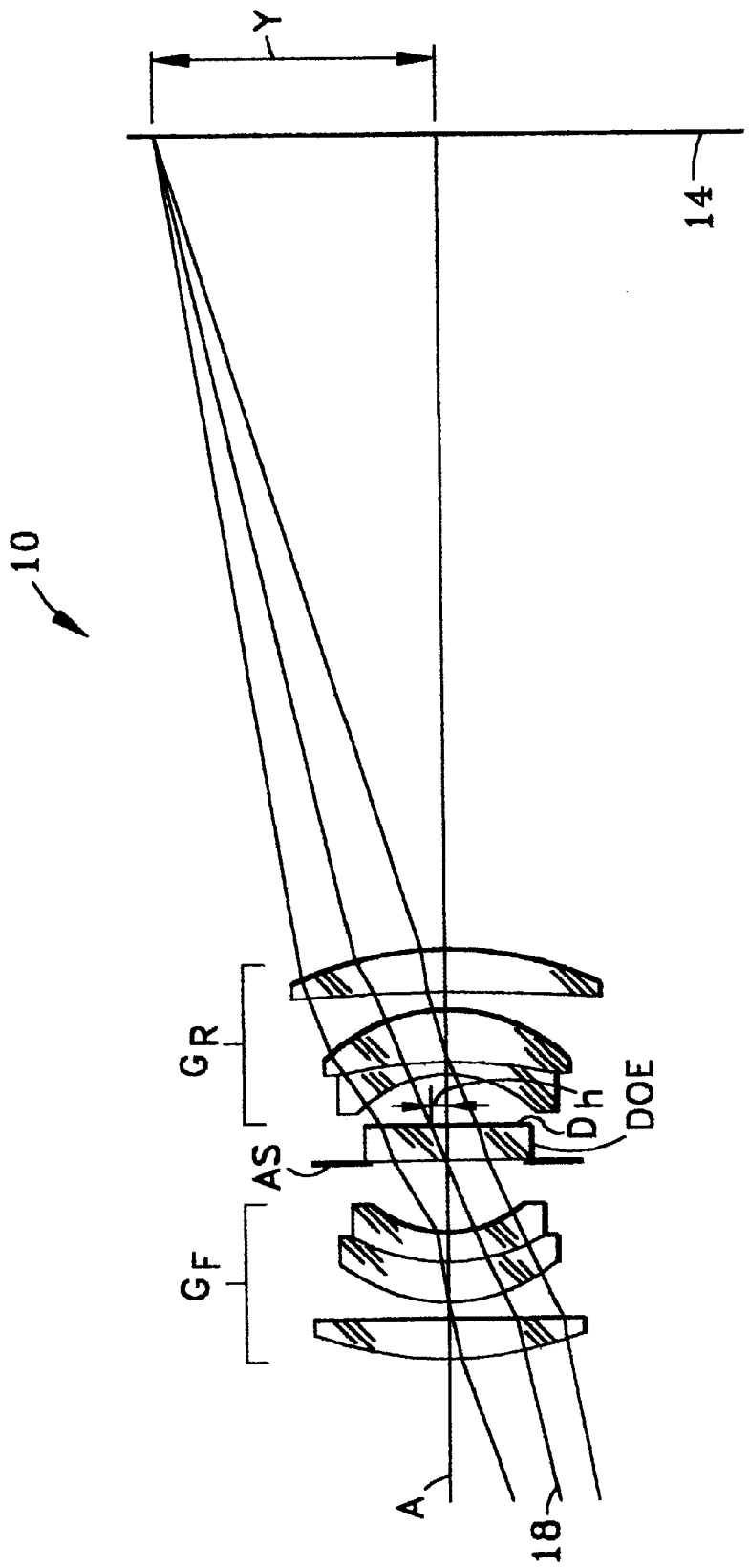
FIG. 1 is a cross-sectional schematic optical diagram showing the typical construction of the imaging optical system according to the present invention.

With reference to FIG. 1 and imaging optical system 10, the present invention is an imaging optical system comprising, in order along optical axis A from an object plane (not shown) to an image plane 14 (i.e., objectwise to imagewise), a front lens group $G_F$ having at least one refractive optical element, a diffractive optical element DOE provided with a diffractive surface D having a positive diffractive power, and a rear lens group $G_R$ having at least one refractive optical element.

The imaging optical system of the present invention preferably satisfies a number of preferred design conditions. The first two preferred conditions are:

$$-0.01 < RSA/f < 0.01 \tag{1}$$

$$-0.002 < LA/f < 0.002, \tag{2}$$

wherein RSA is the spherical aberration at the e-line wavelength (546.1 nm) at the maximum numerical aperture of a system wherein a plane (i.e., non-diffractive) surface is substituted for the diffractive surface of the diffractive optical element. In other words, RSA is the amount of e-line spherical aberration at the maximum numerical aperture in the limit as the amount of diffractive power of diffractive surface D approaches zero. Also, LA is a maximum amount of axial chromatic aberration of the imaging optical system for 400–850 nm wavelength light, measured relative to the e-line wavelength. The overall focal length of the imaging optical system is f. The reasons why these conditions are preferably satisfied are elucidated below.

Figure 2:
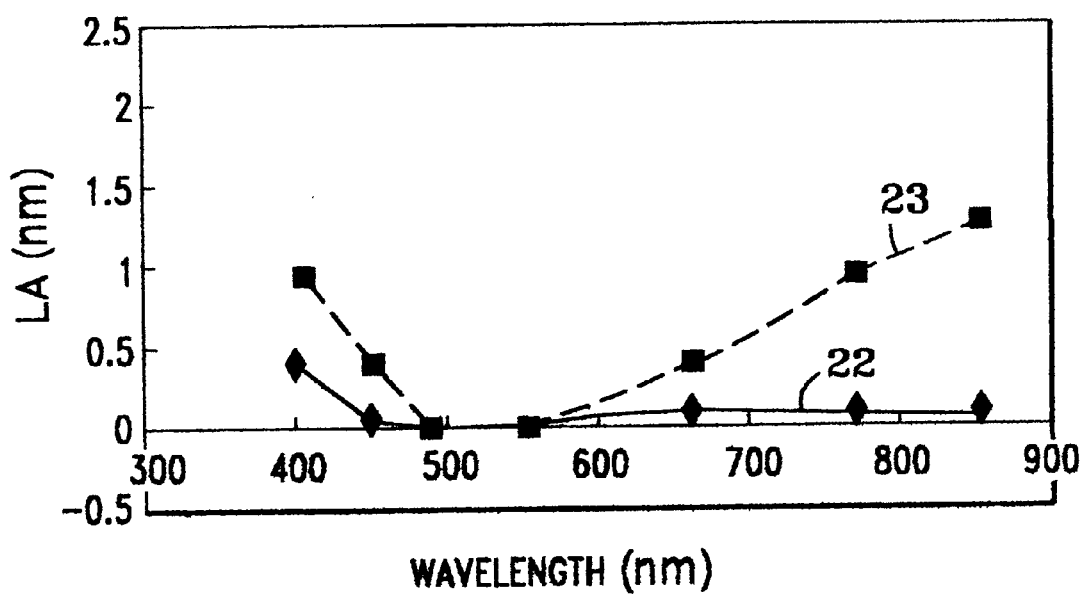
FIG. 2 is a plot of the typical axial chromatic aberration of the imaging, optical system according to the present invention.

With reference now to FIG. 2, the curve 22 (solid line) describes the typical axial chromatic aberration characteristics (LA) of an imaging optical system according to the present invention. For purposes of comparison, the chromatic aberration characteristics of an optical system constructed with only refractive optical elements having a specification identical thereto are described by curve 23 (dashed line). The identical specification means a system wherein a planar surface is substituted for diffractive surface D. For example, where a diffractive surface is formed on one side of a plane parallel plate, the identical all-fractive system comprises front group $G_F$, a plane parallel plate, and rear group $G_R$.

It can be clearly seen from FIG. 2 and curves 22 and 23 that, by combining a diffractive optical element with an ordinary refractive optical element, axial chromatic aberration is satisfactorily corrected from the visible region, extending from the vicinity of 400 nm to 700 run to as far as the infrared region in the vicinity of 850 nm.

Thus, the present invention first comprises front group $G_F$ and rear group $G_R$ so that, in a system wherein a planar surface is substituted for diffractive surface D, spherical aberration, coma, astigmatism, curvature of field and distortion are generally corrected. Moreover, diffractive surface D ensures that axial chromatic aberration and transverse chromatic aberration are sufficiently corrected in the final imaging optical system.

Thus, the imaging optical system wherein a plane surface is substituted for diffractive surface D must be constructed so that spherical aberration RSA satisfies condition (1). If the total sum of the spherical aberration due to front group $G_F$, the element wherein the planar surface is substituted for diffractive surface D, and rear group $G_R$ is such that RSA/f falls below the lower limit in condition (1) or exceeds the upper limit in condition (1), the burden of aberration correction placed on the diffractive surface to satisfactorily correct spherical aberration becomes excessive. In addition, spherochromatism becomes conspicuous.

An image satisfactorily corrected for chromatic aberration can be obtained by correcting the spherical aberration of the imaging optical system wherein a planar surface is substituted for the diffractive surface to the range indicated in condition (1), and by constructing diffractive surface D so that the axial chromatic aberration of the entire system satisfies condition (2).

Figure 6:
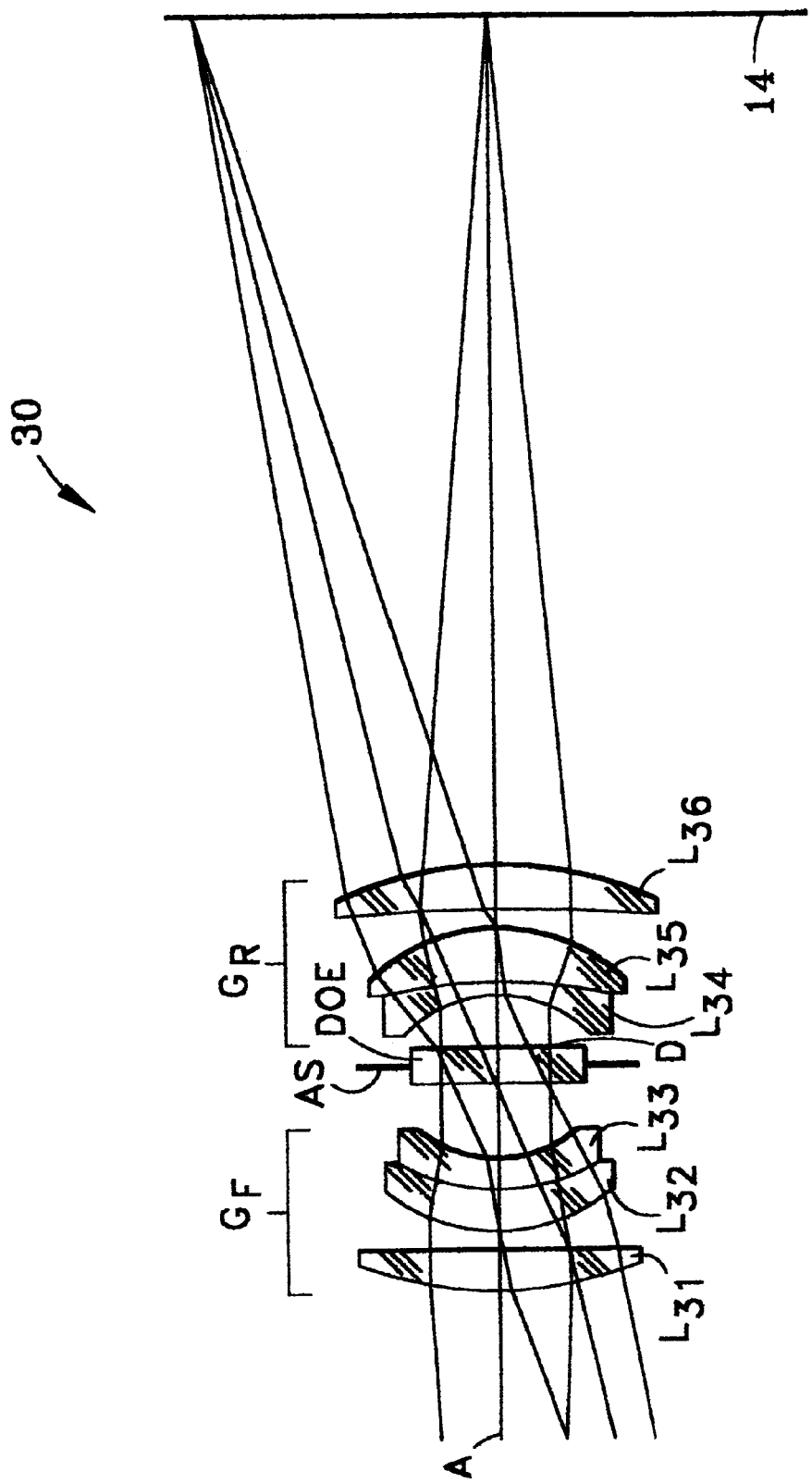
FIG. 6 is a cross-sectional schematic optical diagram of Working Example 1 of the imaging optical system according to the present invention.
Figure 8:
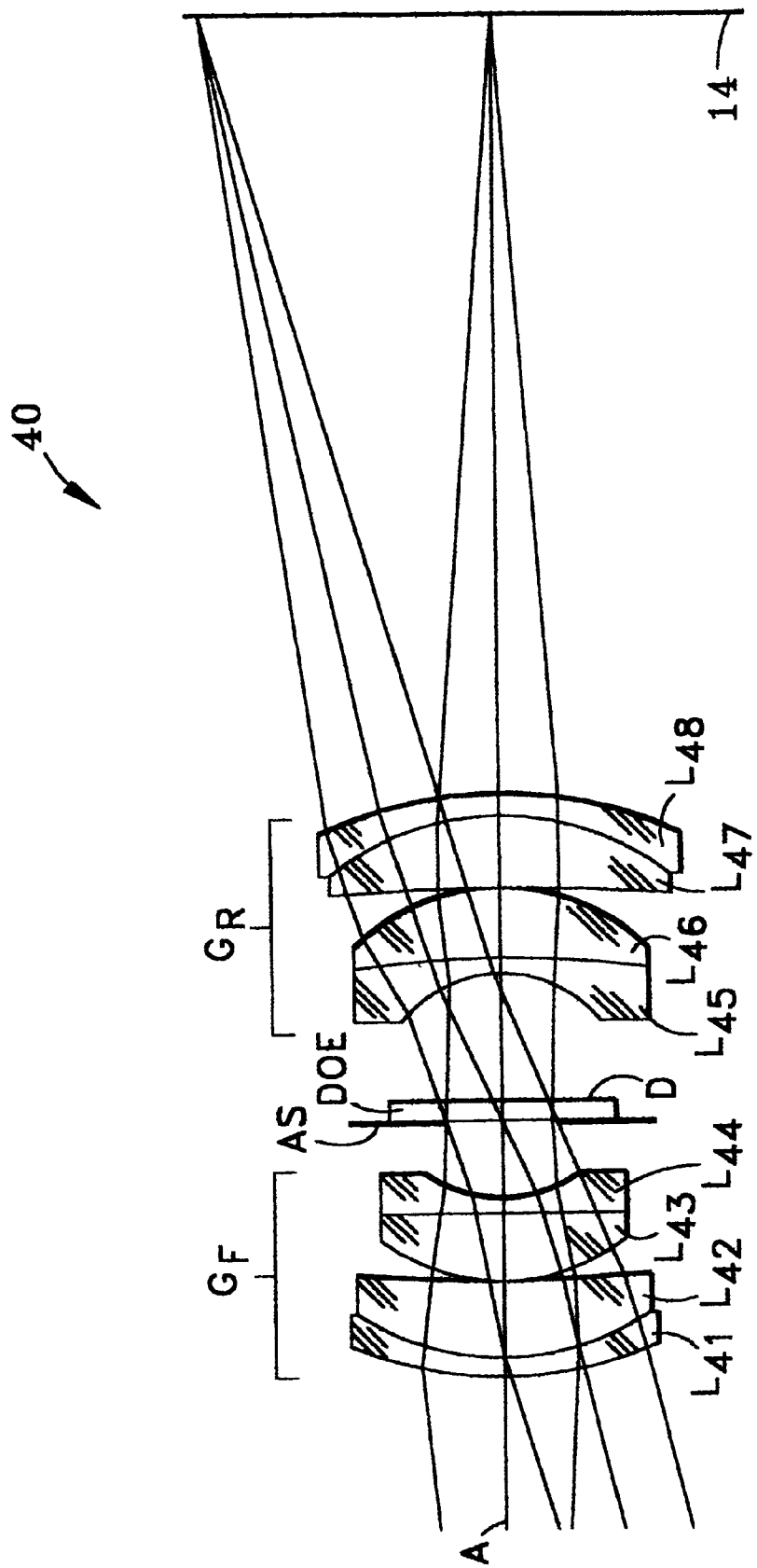
FIG. 8 is a cross-sectional schematic optical diagram of Working Example 2 of the imaging optical system according to the present invention.
Figure 9D:
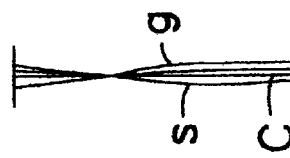
FIGS. 9A–9D are plots of spherical aberration, astigmatism, distortion and transverse chromatic aberration, respectively, for Working Example 2 of FIG. 8.
Figure 9C:
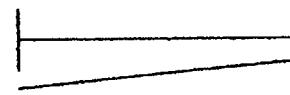
Figure 9B:
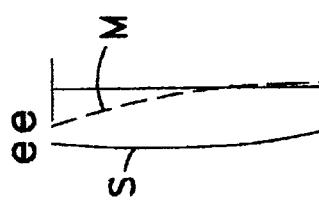
Figure 9A:
Figure 10:
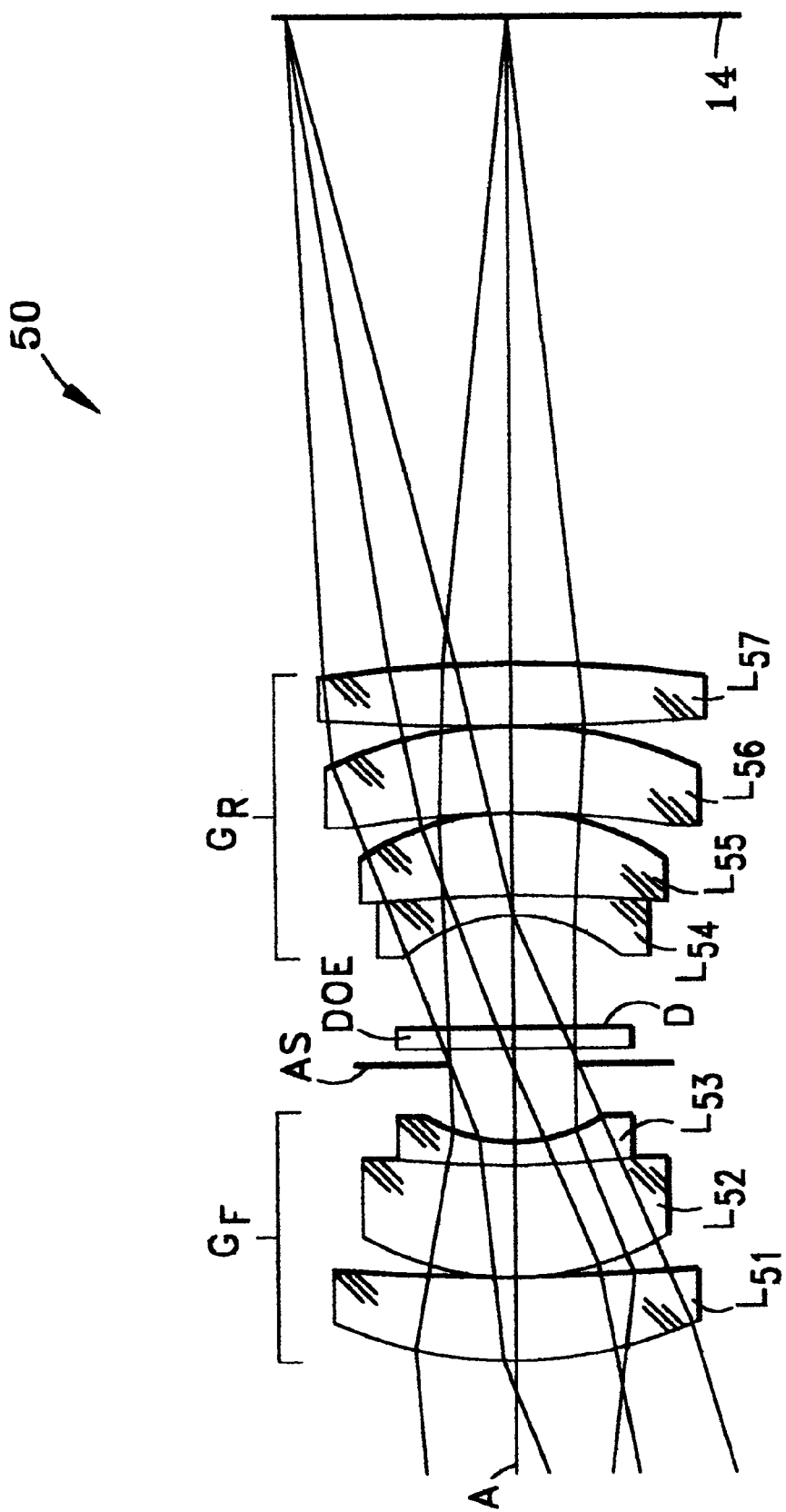
FIG. 10 is a cross-sectional schematic optical diagram of Working Example 3 of the imaging optical system according to the present invention.
Figure 11:
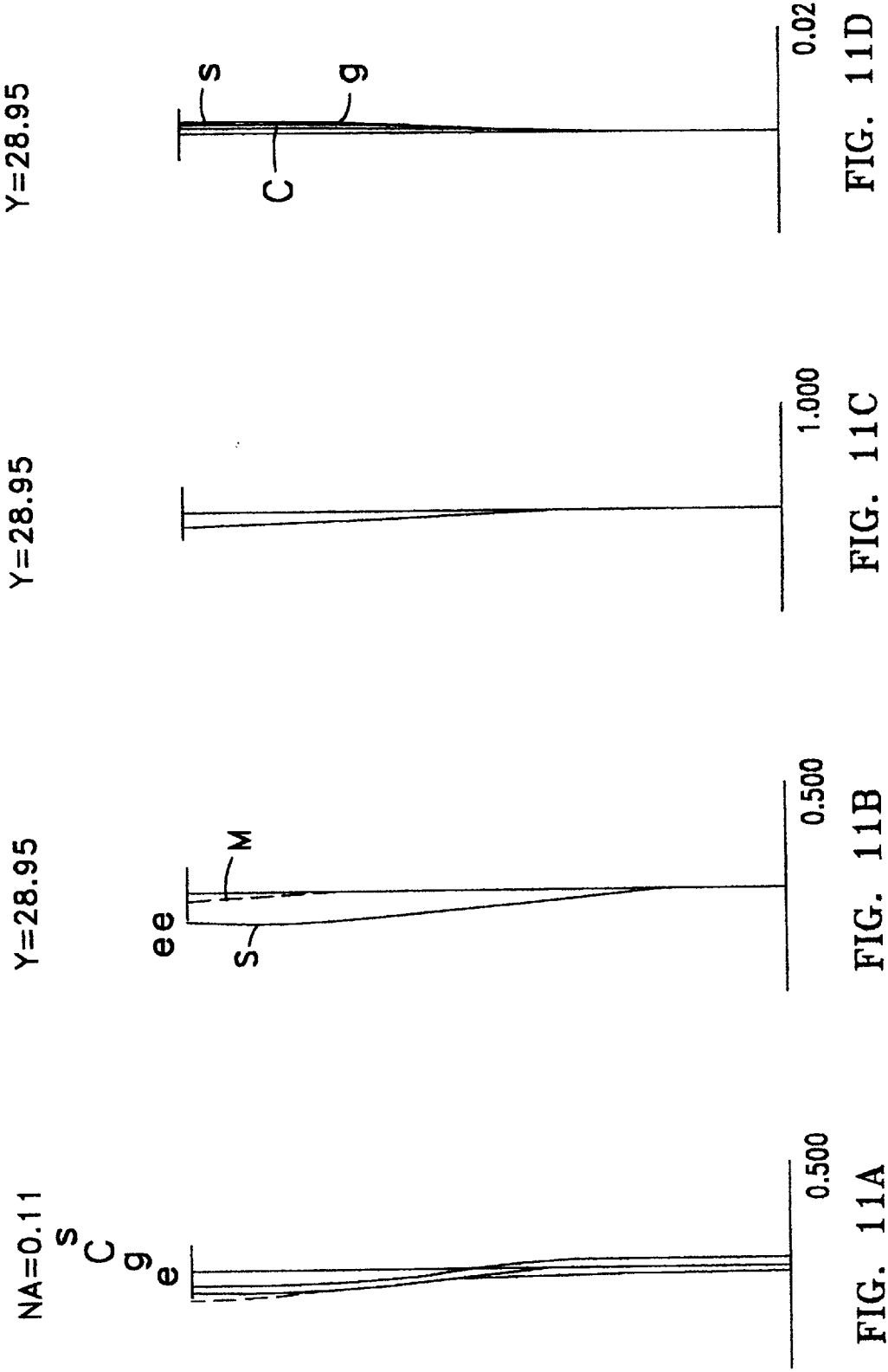
FIGS. 11A–11D are plots of spherical aberration, astigmatism, distortion and transverse chromatic aberration, respectively, for Working Example 3 of FIG. 10.
Figure 12:
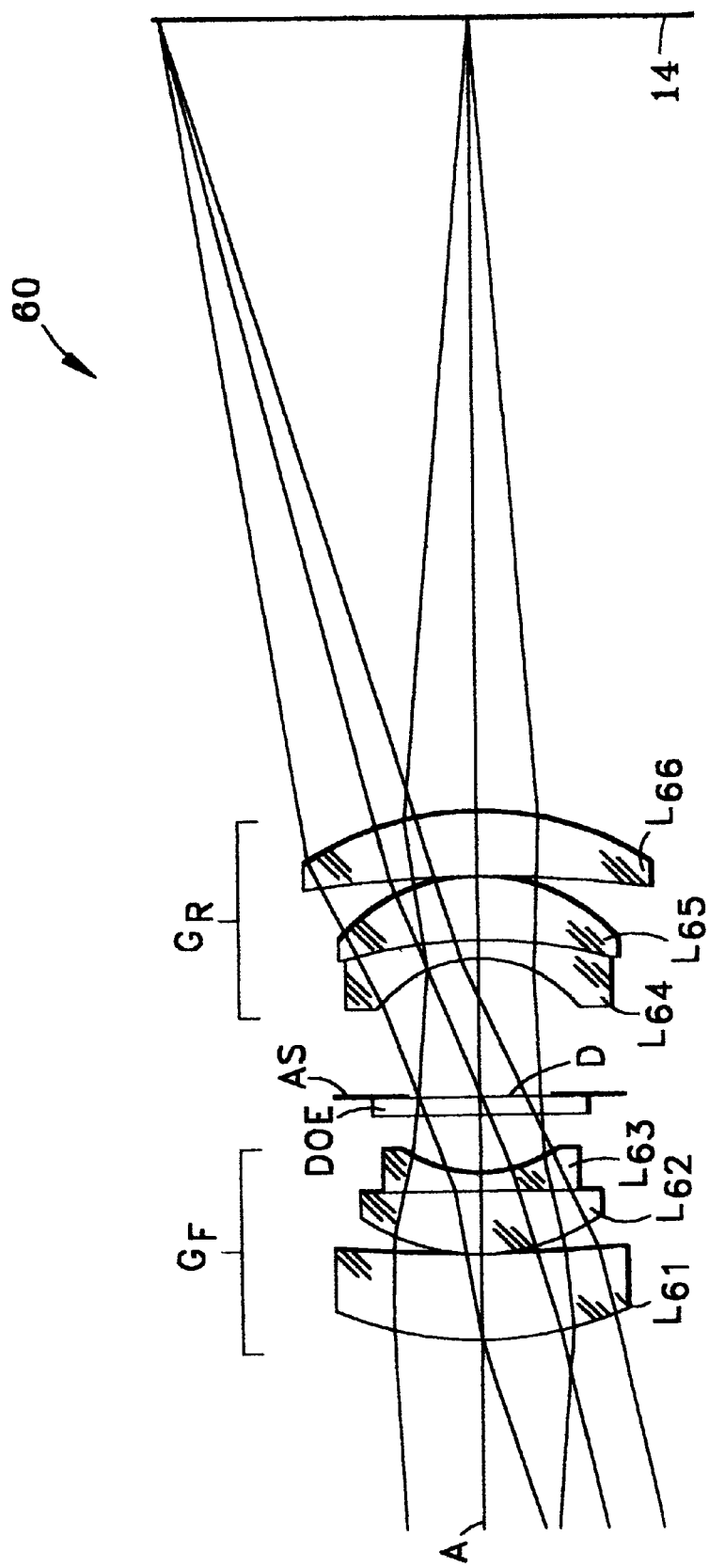
FIG. 12 is a cross-sectional schematic optical diagram of Working Example 4 of the imaging optical system according to the present invention.
Figure 13D:
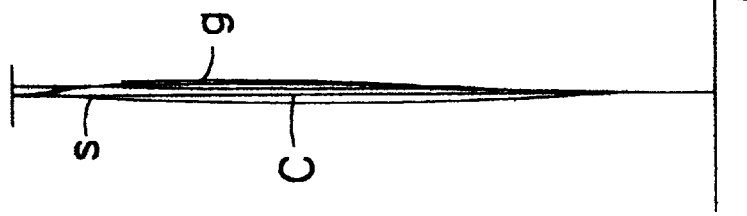
FIGS. 13A–13D are plots of spherical aberration, astigmatism, distortion and transverse chromatic aberration, respectively, for Working Example 4 of FIG. 12.
Figure 13C:
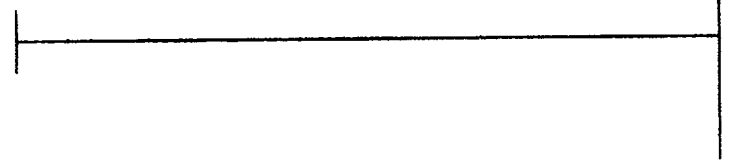
Figure 13B:
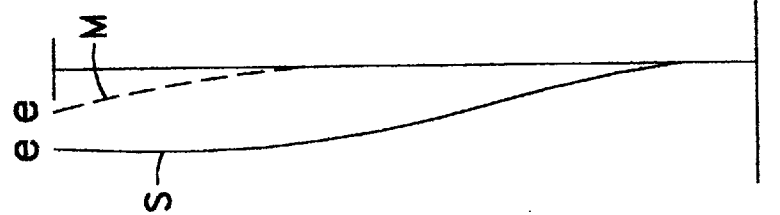
Figure 13A:
Figure 14:
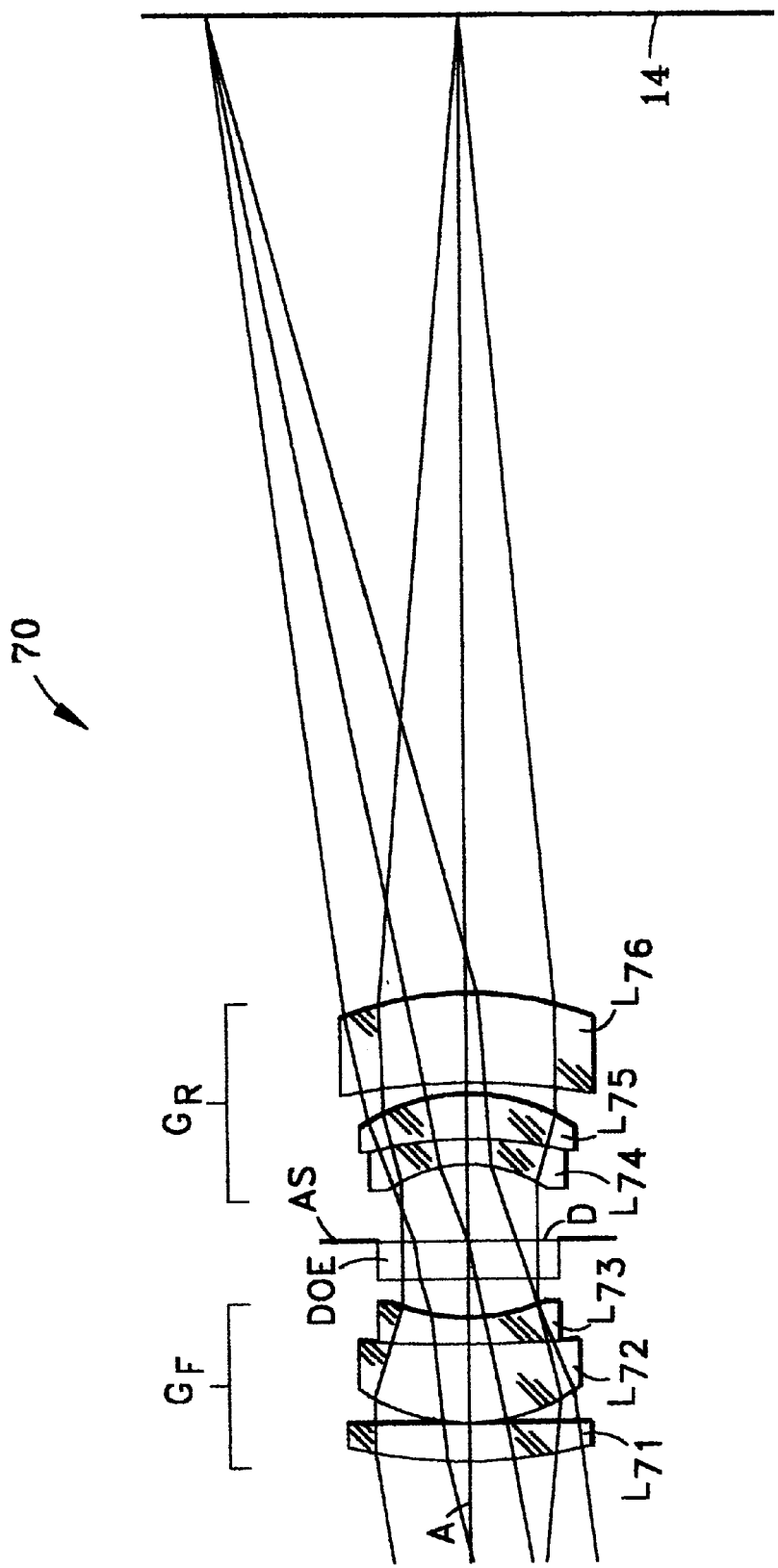
FIG. 14 is a cross-sectional schematic optical diagram of Working Example 5 of the imaging optical system according to the present invention.
Figures 15A, 15B, 15C, 15D:
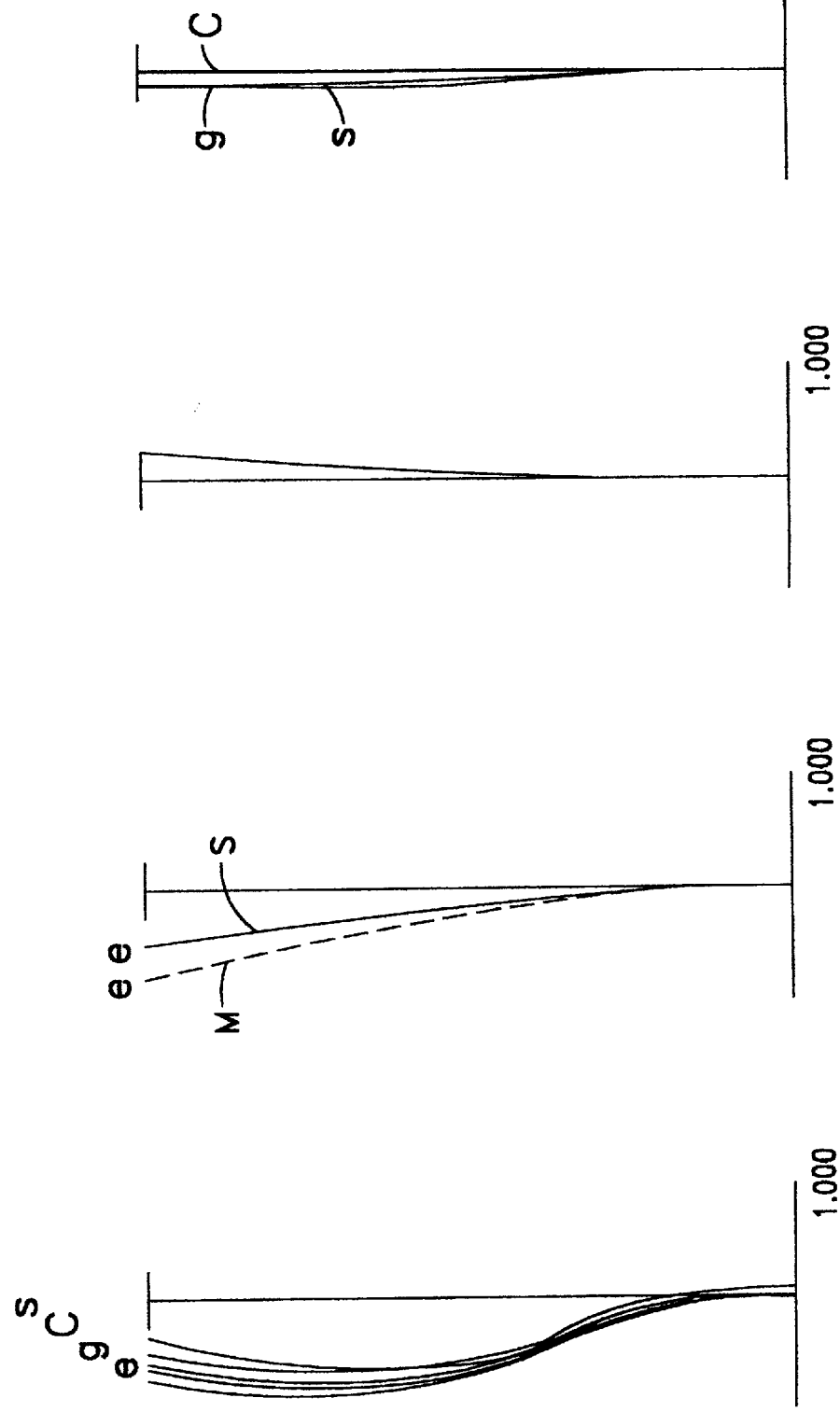
FIGS. 15A–15D are plots of spherical aberration, astigmatism, distortion and transverse chromatic aberration, respectively, for Working Example 5 of FIG. 14.
Figure 16:
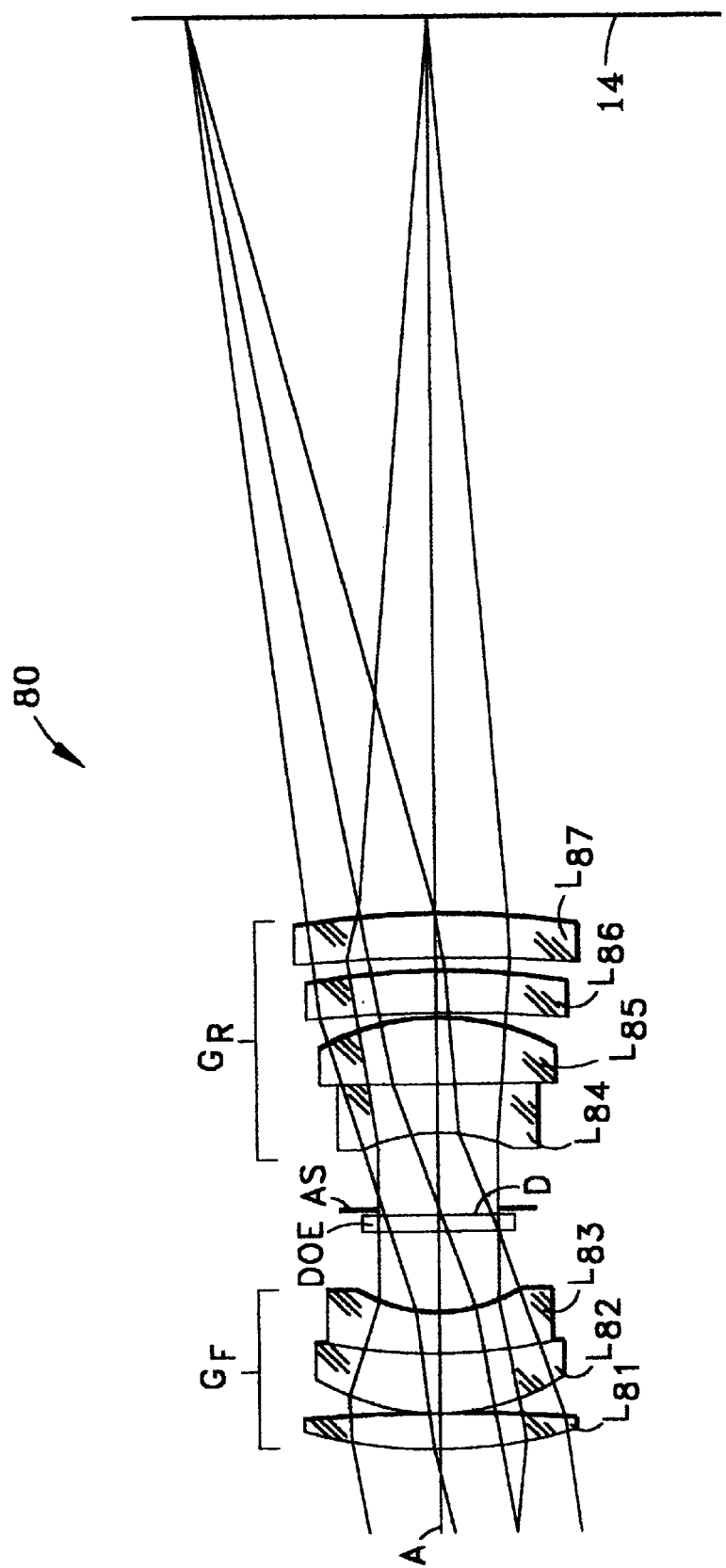
FIG. 16 is a cross-sectional schematic optical diagram of Working Example 6 of the imaging optical system according to the present invention.

With reference now to FIG. 6 and optical imaging system 30, it is preferable that the present invention have a construction wherein front group $G_F$ has at least one positive lens (e.g., lens L31) and, imagewise of that positive lens, at least one negative lens (e.g., lens L33) having an imagewise concave surface. Further, it is preferable that rear group $G_R$ have at least one positive lens (e.g., lens L36), and objectwise of that positive lens, has at least one negative lens (e.g., lens L34) having an objectwise concave surface.

In an imaging optical system used at finite distances, as in an imaging optical system for a scanner, the entire system must be made compact by shortening the distance from the object plane to the image plane (i.e., image plane 14) wherein a light-receiving element (e.g, a detector or image pick-up device) is arranged. Consequently, the field-angle 2ω covered by the imaging optical system must be widened.

To ensure satisfactory imaging across a wide field-angle 2ω of at least 20°, the various aberrations of a single color (wavelength) must be satisfactorily corrected by a refractive optical element that assumes the main burden of refractive power. Accordingly, a lens type is known wherein the Petzval sum can be corrected and a flat image plane ensured by providing, objectwise of the aperture stop, a negative lens having an imagewise concave surface, and by providing, imagewise of the aperture stop, a negative lens having an objectwise concave surface. For example, it is effective to combine this existing lens type with a diffractive optical element.

Next, it is preferable the present invention satisfy the following conditions:

$$0 < LA_{RS}/f < 0.1 \tag{3}$$

$$-0.1 < LA_{DS}/f < 0, \tag{4}$$

wherein $LA_{R_S}$ is the amount axial chromatic aberration of the s-line (852.1 nm), with the e-line as the reference, wherein diffractive surface D is substituted with a planar surface. Further, $LA_{DS} \equiv LA_S - LA_{Rs}$, wherein $LA_S$ is the amount of axial chromatic aberration of the s-line, with the e-line as the reference.

Now, let $LA_R$ be defined as the amount of axial chromatic aberration of each wavelength, with the e-line as the reference, wherein a planar surface is substituted for diffractive surface D. Then $LA_D \equiv LA - LA_R$, where LA is the amount of axial chromatic aberration of each wavelength of the imaging optical system, with the e-line as the reference. Here, $LA_D$ is the difference between axial chromatic aberration LA of the imaging optical system having a diffractive surface and axial chromatic aberration $LA_R$ of the system wherein a planar surface is substituted for the diffractive surface. Therefore, $LA_D$ is the amount of axial chromatic aberration of diffractive surface D. The values $LA_R$, and $LA_{Ds}$ in condition (3) and condition (4) are values at the s-line of axial chromatic aberrations $LA_R$ and $LA_D$, respectively.

To correct axial chromatic aberration over a wide wavelength range, as discussed earlier, the achromatism characteristics of the refractive optical element(s) and the wavelength-dispersion characteristics of the diffractive optical element must be considered. Also, the axial chromatic aberration $LA_R$ of the system wherein a planar surface is substituted for diffractive surface D, and the axial chromatic aberration $LA_D$ including the diffractive surface, must be set based on an appropriate ratio.

With achromatism due to just refractive optical elements wherein a low-dispersion glass is used for the positive lens, a high-dispersion glass is used for the concave lens. If these lenses are cemented together, the axial chromatic aberration increases sharply in the infrared region, even if sufficiently corrected for practical purposes in the visible region. This is shown by curve 23 of FIG. 2. On the other hand, the diffractive action of a diffractive optical element is linear with respect to the wavelength and strengthens as the wavelength lengthens, in contrast to a refractive optical element. The use of this difference in dispersion characteristics is effective in the correction of the focal point position particularly in the infrared region. However, if chromatic aberration is corrected by combining a diffractive optical element and a refractive optical element, negative chromatic aberration remains in the infrared region if correction by the diffractive optical element is too strong.

Therefore, axial chromatic aberration from the visible region to the infrared region in the vicinity of 850 nm can be satisfactorily corrected in the final imaging optical system by setting the correction of axial chromatic aberration $LA_R$ and the correction of axial chromatic aberration $LA_D$ such that condition (3) and condition (4) are satisfied.

The satisfactory correction of axial chromatic aberration by appropriately combining a diffractive optical element and a refractive optical element will now be explained with reference to FIGS. 3A–3C. With reference first to FIG. 3B, it can be se,en in curves a, b and c that axial chromatic aberration $LA_D$ of the diffractive surface is linear with respect to the wavelength, and only its gradient can be adjusted. Accordingly, to satisfactorily correct axial chromatic aberration LA of the final imaging optical system, it is necessary to first correct axial chromatic aberration $LA_R$ so that it is as linear as possible with respect to the wavelength, as shown in curve b of FIG. 3A.

Figure 3A:
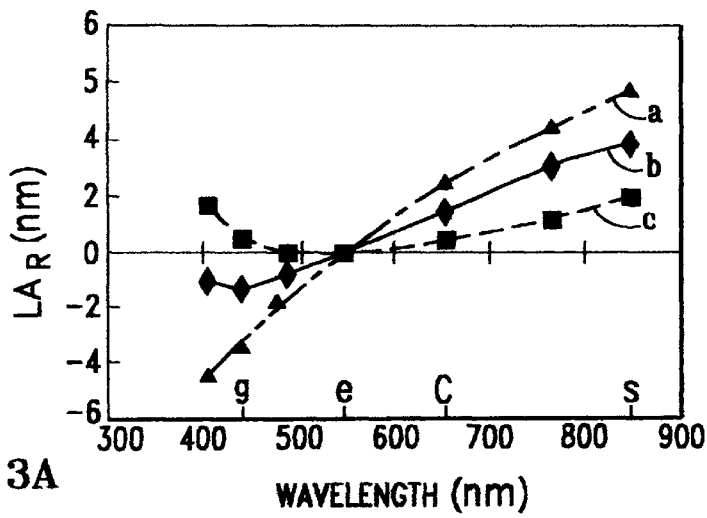
FIG. 3A is plot of the wavelength characteristics of axial chromatic aberration $LA_R$ of the imaging optical system of the present invention wherein a planar (i.e., non-diffracting) surface is substituted for the diffractive surface.
Figure 3B:
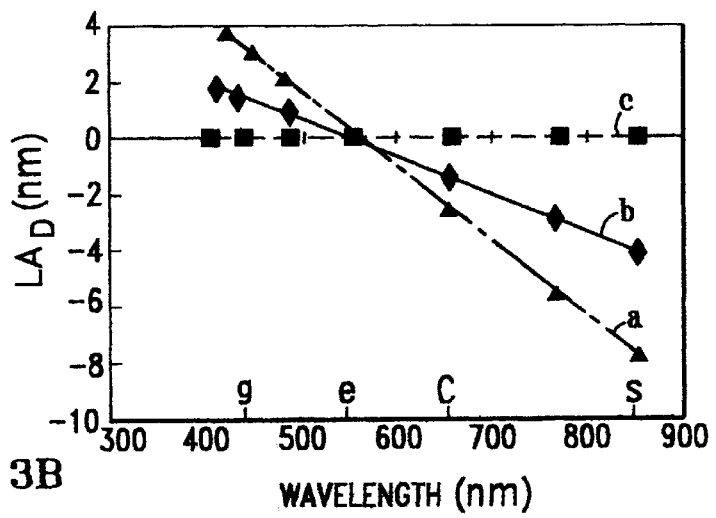
FIG. 3B is a plot of the wavelength characteristics of axial chromatic aberration $LA_D$ of the imaging optical system of the present invention with a diffractive surface.

If the value of $LA_{Rs}$ at the s-line of $LA_R$ is reduced more than the state indicated by curve b of FIG. 3A, the wavelength characteristics of $LA_R$ lose their nearly linear form and become downwardly convex, as indicated by curve c of FIG. 3A. Accordingly, even if $LA_D$ is shaped so that the $LA_R$ wavelength characteristics are optimally corrected (as indicated by curve c of FIG. 3B), the final LA wavelength characteristics inevitably become convex in the downward direction, as indicated by curve c of FIG. 3C. Accordingly, satisfactory correction cannot be achieved.

In particular, if $LA_{Rs}$ is reduced and $LA_{Rs}/f$ falls below the lower limit in condition (3), $LA_R$ on the short wavelength side becomes overcorrected in the positive direction more than the e-line and, for example, the g-line in the visible region, as indicated by curve c in FIG. 3A. If an attempt is made at this time to correct LA on the short wavelength side by adding with $LA_D$, the increase in LA on the long wavelength side, due to the wavelength linearity of the diffractive optical element, becomes conspicuous. As a result, LA in the infrared region becomes overcorrected, as indicated by curve c in FIG. 3C.

Conversely, if $LA_{Rs}$ increases more than the state as indicated by curve b of FIG. 3A, the wavelength characteristics of $LA_R$ lose their nearly linear shape and become upwardly convex, as shown in a of FIG. 3(A). Accordingly, even if $LA_D$ is shaped so that the wavelength characteristics of $LA_R$ are optimally corrected, as indicated by curve a of FIG. 3B, the final wavelength characteristics of LA inevitably become upwardly convex, as indicated by curve a of FIG. 3C. Accordingly, satisfactory correction cannot be achieved.

In particular, if $LA_{Rs}$ is increased and $LA_{Rs}/f$ exceeds the upper limit in condition (3), $LA_R$ is overcorrected in the infrared region, as shown in FIG. 3A. Also, if the, C-line, for example, of the long wavelength is overcorrected more than the e-line in the visible region, $LA_R$ is undercorrected in the negative direction with respect to light of short wavelength like the g-line. Thus, chromatic aberration in the form of $LA_R$ unfortunately remains.

Figure 3C:
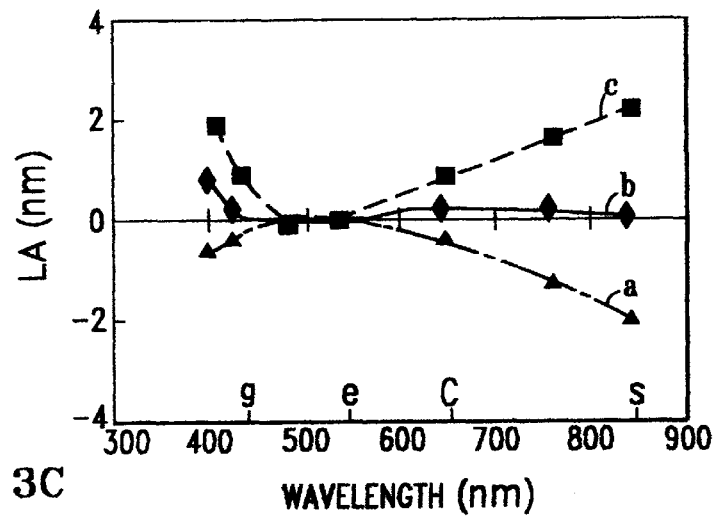
FIG. 3C is a plot of the wavelength characteristics of axial chromatic aberration LA of the imaging optical system of the present invention.

If an attempt is made to correct LA on the short wavelength side in the positive direction by adding $LA_D$, LA becomes undercorrected at the s-line, as indicated by curve a in FIG. 3C, due to the reduction in LA on the long wavelength side, particularly the significant reduction in LA in the infrared region, simultaneous with the increase in LA on the short wavelength side.

Condition (3) quantitatively stipulates, by the $LA_{Rs}$ value in the s-line the wavelength, characteristics of $LA_R$ needed to satisfactorily correct the final LA wavelength characteristics. In contrast, condition (4) quantitatively stipulates, by the $LA_{Ds}$ value in the s-line, the wavelength characteristics of $LA_D$ needed to satisfactorily correct the final LA wavelength characteristics.

If the power of the diffractive surface is increased and the value of $LA_{Ds}$ is such that $LA_{Ds}/f$ falls below the lower limit value in condition (4), a large negative LA unfortunately remains in the infrared region if combined with a refractive optical element. This is the opposite of the case if only an ordinary refractive optical element were used.

Conversely, if the value of $LA_{Ds}$ is such that $LA_{Ds}/f$ exceeds the upper limit in condition (4), the correction of LA in the infrared region is inadequate if the value of $LA_{Ds}$ is 0, the same as the case of just a refractive optical element. Furthermore, if the value in condition (4) becomes positive, positive axial chromatic aberration in the infrared region is added more than the case of only a refractive optical element. This invites a significant deterioration in imaging performance.

As described above, axial chromatic aberration can be satisfactorily corrected over a range extending from the visible region to the infrared region in the vicinity of 850 nm by combining, under appropriate conditions, axial chromatic aberration $LA_R$ in the infrared s-line of the system and axial chromatic aberration $LA_D$.

Next, it is preferable the imaging optical system of the present invention satisfy the following condition:

$$10 < f_{DOE}/f < 100 \qquad (5)$$

wherein $f_{DOE}$ is the focal length of diffractive optical element DOE. If the diffractive power of the diffractive optical element is weak to the point where $f_{DOE}/f$ exceeds the upper limit in condition (5), the difference between the present invention and existing optical systems based on only a refractive optical element becomes insignificant with respect to the correction of the secondary spectrum. Also, the correction of chromatic aberration cannot be achieved over a wide wavelength range. Conversely, if the diffractive power of the diffractive optical element is strong to the point that $f_{DOE}/f$ falls below the lower limit in condition (5), axial chromatic aberration becomes undercorrected in the infrared region.

With reference again to FIG. 1, it is also preferable the imaging optical system of the present invention satisfy the following condition:

$$-0.1 < h/y < 0.1 \qquad (6)$$

wherein h is the maximum incident height of a principal ray 18 impinging on diffractive surface D, and y is maximum image height. The reasoning for including this condition is as follows.

To ensure satisfactory performance over the entire image plane, it is essential to correct monochromatic and chromatic aberration as well as to correct axial chromatic aberration. In addition, it is essential to satisfactorily correct transverse chromatic aberration in the periphery of image plane 14.

Consider the case where a single diffractive optical element is combined with a plurality of refractive optical elements. As mentioned earlier, the dispersion characteristics with respect to wavelength differ greatly between diffractive and refractive optical elements. On the other hand, transverse chromatic aberration is significantly affected by the height from the optical axis of the principal ray. Consequently, if a diffractive optical element is arranged at a position greatly removed from the pupil of the optical system, then the correction of transverse chromatic aberration becomes impossible.

If the field-angle of the imaging optical system is not very wide, it is rot difficult to determine where to arrange the diffractive optical element in the optical system. However, to ensure a field-angle exceeding 20° as in the present invention, it is preferable to arrange diffractive optical element DOE such that maximum principal ray height h at the position of diffractive surface D is within the range of condition (6).

If h/y falls below the lower limit in condition (6) and an attempt is made to correct negative transverse chromatic aberration of the diffractive optical element by another refractive optical element, the third wavelength is undercorrected even if the second wavelength is corrected. In other words, the secondary spectrum in the transverse chromatic aberration cannot be corrected.

Conversely, if h/y exceeds the upper limit in condition (6) and an attempt is made to correct positive transverse chromatic aberration of the diffractive optical element by another refractive optical element, the third wavelength is overcorrected even if the second wavelength is corrected. In other words, the secondary spectrum in the transverse chromatic aberration cannot be corrected.

Figure 4:
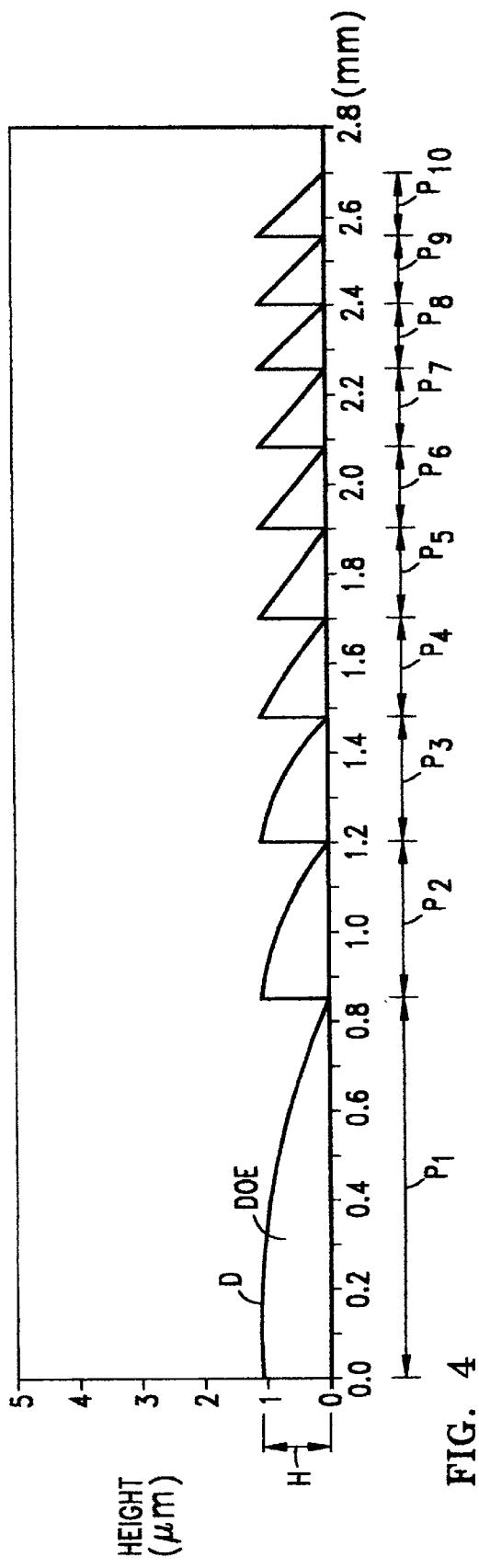
FIG. 4 is a right half cross-sectional view of a kinoform diffractive optical element.

In a preferred embodiment of the imaging optical system according to the present invention, diffractive surface D is a kinoform (i.e., a saw-toothed shape ring), such as shown in FIG. 4. Further, it is preferable that the minimum radial pitch of the sawtooth ring of the kinoform be in the range of $1 \times 10^{-3}$ f–$9 \times 10^{-3}$ f, and that the height H of the sawtooth ring be 0.5–1.5 $\mu$m.

In addition, in another preferred embodiment of the imaging optical system according to the present invention, it is preferable that diffractive surface D be binary, wherein the height of the kinoform shape is distributed over at least eight levels. Further, it is preferable that the minimum radial pitch of the binary sawtooth ring be $1 \times 10^{-3}$ f–$9 \times 10^{-3}$ f, and that height H of the sawtooth ring be 0.5–1.5 $\mu$m.

With continuing reference to FIG. 6, to satisfactorily correct spherical aberration and ensure brightness in the imaging optical system of the present invention, it is preferable to arrange at least one positive lens in front group $G_F$ and rear group $G_R$, respectively. In this case, it is preferable the imaging optical system of the present invention satisfy the following condition:

$$n_p > 1.6, \tag{7}$$

wherein $n_p$ is the average value of the refractive index of the positive lenses in the imaging optical system.

Techniques for designing a diffractive optical element include a lattice model and a high-refractive index model. These techniques are disclosed in, for example, in the reference "Introduction to Diffractive Optical Elements," Japanese Society of Applied Physics, Optical Society of Japan, Optics Design Research Group; Optronics, Inc. In the design stage, both techniques handle the diffractive surface as a virtual phase transform surface having no real shape. Then, a procedure is executed which transforms the phase function $\phi$ into a real shape in the final design stage. The phase function $\phi$ is expressed by, for example:

$$\phi(r) = C_2 \times r^2 + C_4 \times r^4 + C_6 \times r^6 + C_8 \times r^8 + C_{10} \times r^{10}$$

wherein $C_2$–$C_{10}$ are coefficients and r is the height from the optical axis. Every time the optical path differential is an integer multiple of wavelength $\lambda$, the real shape forms a ring on the planar surface.

The pitch p of the lattice of the sawtooth-shaped ring is defined by:

$$p = m\lambda/(d\phi(r)/dr)$$

wherein m is the diffraction order, and $\lambda$ is the reference wavelength.

Pitch p in the above expression is a continuous function. However, the width of each ring in FIG. 4 has a discrete pitch $p_i$. In the Working Examples of the present invention explained below, pitch $p_i$ is minimized at the outermost periphery.

To satisfactorily correct axial chromatic aberration over a wide range f-Om the visible region to the infrared region, it is preferable that the following condition be satisfied:

$$1 \times 10^{-3} < p_{min}/f < 9 \times 10^{-3} \tag{8}$$

wherein f is the focal length of the entire system, and $p_{min}$ is the minimum pitch in the radial direction of the sawtooth-shaped ring.

In addition, height H of the sawtooth-shaped ring is defined by:

$$H = m\lambda/(n-1)$$

wherein n is refractive index of the plate.

If the design reference wavelength $\lambda$ is set to 546.1 nm (e-line), the diffractive order m is set to m=+1, and quartz, for example, is used as the plate upon which diffractive optical element DOE is formed, then:

$$H = 1.0385 \; \mu m.$$

If the goal of the present invention takes into consideration the working, wavelength, diffractive order M and refractive index n of the plate glass, then it is preferable that height H of the sawtooth-shaped ring satisfy:

$$0.5 \; \mu m < H < 1.5 \; \mu m \tag{9}$$

Figure 5:
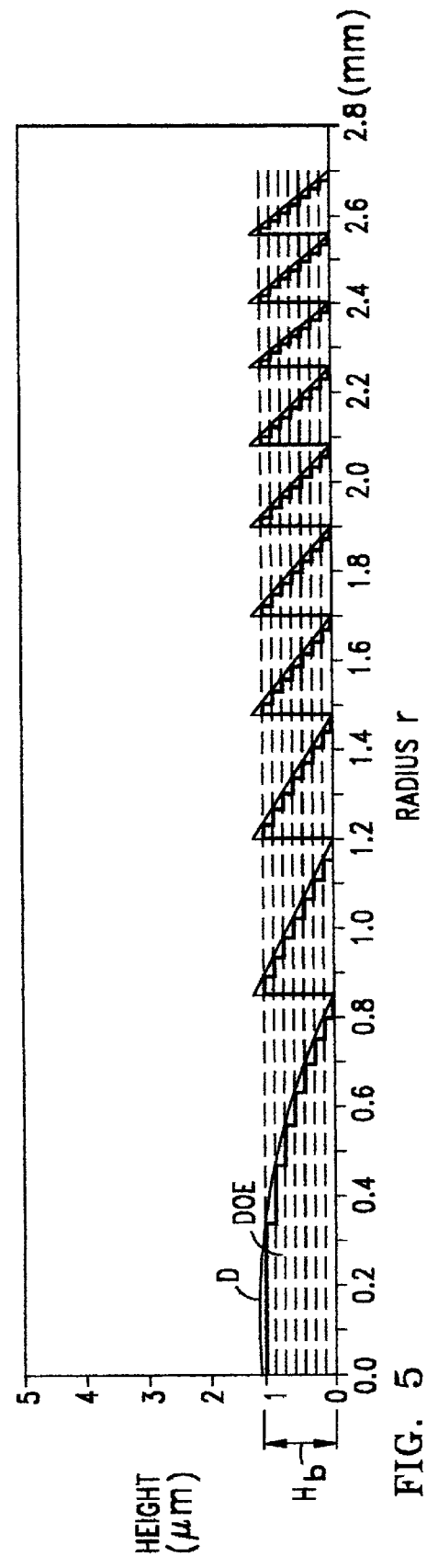
FIG. 5 is a right half cross-sectional view of a binary diffractive optical element having eight levels approximating the kinoform-shaped diffractive optical element of FIG. 4.

Furthermore, with reference to FIG. 5, a binary optical element (BOE), in which the cuneiform is step approximated can also be used. The diffractive efficiency of a stepped approximation is 41% at two levels, 81% at four levels and 95% at eight levels. Since the approximation error invites a deterioration in image quality like flare, it is preferable for the purposes of the present invention that the number of binary levels be eight or greater.

When using a binary optical element, it is preferable to satisfy the abovementioned conditions (8) and condition (9). However, height $H_b$ of the sawtooth-shaped ring of the binary optical element is given by:

$H_b = H(b-1)/b$ wherein, H is the height of the original cuneiform sawtooth-shaped ring;, and b is the number of levels.

WORKING EXAMPLES

Even-numbered FIGS. 6–16 show Working Examples 1 to 6, respectively, of the imaging optical system according to the present invention. With reference to FIG. 1 and imaging optical system 10, the imaging optical system of each Working Example is provided with, objectwise to imagewise along optical axis A, front group $G_F$ having at least one refractive lens, diffractive optical element DOE provided with diffractive surface D having positive diffractive power, and rear group $G_R$ having at least one refractive lens. The preferred use of the imaging optical system of the present invention is as an optical system for an optical scanner.

In each Working Example, front group $G_F$ has at least one positive lens and a most imagewise negative lens having an imagewise concave surface. In addition, rear group $G_R$ has at least one positive lens and a most objectwise negative lens having an objectwise concave surface. The aperture stop in each Figure is represented by AS.

Odd-numbered FIGS. 7–17 are aberration plots for spherical aberration, astigmatism, distortion and transverse chromatic aberration for Working Examples 1–6, respectively. In each aberration plot, g is the g-line (435.8 mu), e is the e-line (546.1 nm), C is the C-line (656.3 nm) and s is the s-line (852.1 nm). In the spherical aberration plots (odd-numbered FIGS. 7A–17A), the broken line indicates offense against the sine condition. In the astigmatism plots (odd-numbered FIGS. 7B–17B), the broken line indicates the meridional image plane and the solid line indicates the sagittal image plane.

Tables 1–6 below set forth the design specifications, including coefficients of phase functions, for Working Examples 1 to 6, respectively. In the Tables, NA represents the imagewise numerical aperture, β represents the imaging magnification, S represents number of each optical surface from the object side, r represents the radius of curvature of each optical surface, d represents the axial distance from each optical surface to the next optical surface (or image plane), $n_e$ represents the refractive index with respect to the e-line of the optical member (blank indicates air) arranged from each optical surface to the next optical surface, $V_e$ represents the Abbe number (e-line) of each optical member, and the last column labeled "Element" lists the reference symbol of each optical member or optical surface.

Tables 7A and 7B list the values for the design conditions (1) to (9) for Working Examples (WE) 1–3 and 4–6, respectively.

TABLE 1

DESIGN SPECIFICATIONS f = 100
NA = 0.083
β = −1.223
2 ω = 31.3°
y = 62
λ = 546.1 nm (e-line)
M = +1
$C_2 = -1.73008 \times 10^{-8}$
$C_4 \sim C_{10} = 0$

TABLE 1-continued

DESIGN SPECIFICATIONS

| S | r | d | $n_e$ | $v_e$ | Element |
|---|---|---|---|---|---|
| 0 | ∞ | 128.13 | | | |
| 1 | 75.435 | 8.28 | 1.776210 | 49.39 | $L_{31}$ |
| 2 | 453.628 | 3.92 | | | |
| 3 | 34.675 | 10.45 | 1.720550 | 47.80 | $L_{32}$ |
| 4 | 113.343 | 2.61 | 1.677648 | 31.93 | $L_{33}$ |
| 5 | 25.024 | 11.33 | | | |
| 6 | ∞ | 6.53 | 1.460118 | 64.49 | DOE |
| 7 | ∞ | 11.33 | | | D |
| 8 | −25.024 | 2.61 | 1.677648 | 31.93 | $L_{34}$ |
| 9 | −113.343 | 10.45 | 1.720550 | 47.80 | $L_{35}$ |
| 10 | −34.675 | 3.92 | | | |
| 11 | −453.628 | 8.28 | 1.776210 | 49.39 | $L_{36}$ |
| 12 | −75.435 | 166.65 | | | |

TABLE 2

DESIGN SPECIFICATIONS f = 100
NA = 0.078
β = −0.55506
2 ω = 28.3°
y = 39.2
λ = 546.1 nm (e-line)
M = +1
$C_2 = -1.00810 \times 10^{-8}$
$C_4 \sim C_{10} = 0$

| S | r | d | $n_e$ | $v_e$ | Element |
|---|---|---|---|---|---|
| 0 | ∞ | 230.87 | | | |
| 1 | 52.981 | 2.57 | 1.554642 | 49.85 | $L_{41}$ |
| 2 | 34.949 | 9.41 | 1.654256 | 58.24 | $L_{42}$ |
| 3 | 148.781 | 0.22 | | | |
| 4 | 26.625 | 8.63 | 1.605201 | 65.14 | $L_{43}$ |
| 5 | 504.415 | 1.90 | 1.615937 | 44.17 | $L_{44}$ |
| 6 | 21.080 | 9.63 | | | |
| 7 | ∞ | 2.57 | 1.460118 | 64.49 | DOE |
| 8 | ∞ | 16.58 | | | D |
| 9 | −18.740 | 1.90 | 1.615937 | 44.17 | $L_{45}$ |
| 10 | −167.228 | 8.63 | 1.605482 | 65.14 | $L_{46}$ |
| 11 | −27.804 | 0.22 | | | |
| 12 | −378.334 | 9.41 | 1.654256 | 58.24 | $L_{47}$ |
| 13 | −39.298 | 2.57 | 1.554642 | 49.85 | $L_{48}$ |
| 14 | −54.799 | 100.84 | | | |

TABLE 3

DESIGN SPECIFICATIONS f = 100
NA = 0.111
β = −0.31496
2 ω = 24.8°
y = 29
λ = 546.1 nm (e-line)
M = +1
$C_2 = -1.88472 \times 10^{-8}$
$C_4 = -7.08689 \times 10^{-12}$
$C_6 \sim C_{10} = 0$

| S | r | d | $n_e$ | $v_e$ | Element |
|---|---|---|---|---|---|
| 0 | ∞ | 347.57 | | | |
| 1 | 58.774 | 9.98 | 1.619921 | 53.73 | $L_{51}$ |
| 2 | 384.448 | 0.14 | | | |
| 3 | 38.023 | 13.60 | 1.747931 | 44.75 | $L_{52}$ |
| 4 | 115.850 | 2.89 | 1.762584 | 31.40 | $L_{53}$ |
| 5 | 25.794 | 11.15 | | | |
| 6 | ∞ | 2.89 | 1.532350 | 55.92 | DOE |

TABLE 3-continued

DESIGN SPECIFICATIONS

| | | | | | |
|---|---|---|---|---|---|
| 7 | ∞ | 14.04 | | | D |
| 8 | −23.945 | 2.17 | 1.762584 | 31.40 | $L_{54}$ |
| 9 | −347.425 | 10.42 | 1.747931 | 44.75 | $L_{55}$ |
| 10 | −38.524 | 0.14 | | | |
| 11 | −178.460 | 11.00 | 1.748009 | 49.28 | $L_{56}$ |
| 12 | −53.957 | 0.28 | | | |
| 13 | 2687.835 | 7.23 | 1.748009 | 49.28 | $L_{57}$ |
| 14 | −183.061 | 79.33 | | | |

TABLE 4

DESIGN SPECIFICATIONS f = 100
NA = 0.087
β = −0.63457
2 ω = 29.7°
y = 43.3
λ = 546.1 nm (e-line)
M = +1
$C_2 = -1.36243 \times 10^{-8}$
$C_4 \sim C_{10} = 0$

| S | r | d | $n_e$ | $v_e$ | Element |
|---|---|---|---|---|---|
| 0 | ∞ | 212.50 | | | |
| 1 | 51.792 | 11.35 | 1.654256 | 40.06 | $L_{61}$ |
| 2 | 168.629 | 0.20 | | | |
| 3 | 26.231 | 8.67 | 1.605482 | 60.39 | $L_{62}$ |
| 4 | 261.056 | 1.85 | 1.610741 | 40.06 | $L_{63}$ |
| 5 | 20.934 | 8.05 | | | |
| 6 | ∞ | 2.37 | 1.460118 | 64.49 | DOE |
| 7 | ∞ | 1.54 | | | D |
| 8 | −18.838 | 1.85 | 1.615937 | 40.06 | $L_{64}$ |
| 9 | −132.453 | 8.67 | 1.605482 | 60.39 | $L_{65}$ |
| 10 | −28.544 | 0.20 | | | |
| 11 | −214.596 | 8.98 | 1.654256 | 40.06 | $L_{66}$ |
| 12 | −47.191 | 109.30 | | | |

TABLE 5

DESIGN SPECIFICATIONS f = 100
NA = 0.087
β = −1.173
2 ω = 19.6°
y = 37.5
λ = 546.1 nm (e-line)
M = +1
$C_2 = -1.75864 \times 10^{-8}$
$C_4 \sim C_{10} = 0$

| S | r | d | $n_e$ | $v_e$ | Element |
|---|---|---|---|---|---|
| 0 | ∞ | 146.05 | | | |
| 1 | 79.708 | 6.44 | 1.732340 | 54.44 | $L_{71}$ |
| 2 | 6978.164 | 0.26 | | | |
| 3 | 37.078 | 13.02 | 1.758440 | 52.09 | $L_{72}$ |
| 4 | 197.360 | 3.15 | 1.754570 | 34.81 | $L_{73}$ |
| 5 | 26.658 | 8.16 | | | |
| 6 | ∞ | 5.26 | 1.532350 | 55.92 | DOE |
| 7 | ∞ | 13.29 | | | D |
| 8 | −25.524 | 4.34 | 1.754570 | 34.81 | $L_{74}$ |
| 9 | −83.849 | 6.84 | 1.758440 | 52.09 | $L_{75}$ |
| 10 | −34.347 | 1.31 | | | |
| 11 | −368.880 | 13.94 | 1.791950 | 47.26 | $L_{76}$ |
| 12 | −75.807 | 45.19 | | | |

TABLE 6

DESIGN SPECIFICATIONS f = 100
NA = 0.083
β = −0.945
2 ω = 20.3°
y = 34.8
λ = 546.1 nm (e-line)
M = +1
$C_2 = -1.99471 \times 10^{-8}$
$C_4 \sim C_{10} = 0$

| S | r | d | $n_e$ | $v_e$ | Element |
|---|---|---|---|---|---|
| 0 | ∞ | 154.08 | | | |
| 1 | 70.425 | 5.17 | 1.732340 | 54.44 | $L_{81}$ |
| 2 | 1188.665 | 0.24 | | | |
| 3 | 36.534 | 8.89 | 1.758440 | 52.09 | $L_{82}$ |
| 4 | 98.820 | 6.06 | 1.754570 | 34.81 | $L_{83}$ |
| 5 | 26.173 | 11.97 | | | |
| 6 | ∞ | 3.23 | 1.532350 | 55.92 | DOE |
| 7 | ∞ | 12.37 | | | D |
| 8 | −27.511 | 7.43 | 1.754570 | 34.81 | $L_{84}$ |
| 9 | −1199.000 | 9.38 | 1.758440 | 52.09 | $L_{85}$ |
| 10 | −41.989 | 1.21 | | | |
| 11 | −237.755 | 6.46 | 1.791950 | 47.26 | $L_{86}$ |
| 12 | −82.333 | 1.61 | | | |
| 13 | −350.467 | 6.46 | 1.791950 | 47.26 | $L_{87}$ |
| 14 | −143.453 | 137.54 | | | |

TABLE 7A

DESIGN CONDITIONS FOR WORKING EXAMPLES 1–3

| DESIGN CONDITION | WE1 | WE2 | WE3 |
|---|---|---|---|
| (1) RSA | −0.008 | −0.002 | −0.001 |
| (2) LA | 0.0014 | 0.0007 | 0.0005 |
| (3) $LA_R$ | 0.039 | 0.011 | 0.012 |
| (4) $LA_D$ | −0.038 | −0.010 | −0.012 |
| (5) $f_{DOE}/f$ | 28.9 | 49.6 | 26.5 |
| (6) h/y | 0.017 | 0.019 | 0.046 |
| (7) $n_p$ | 1.74838 | 1.629799 | 1.72236 |
| (8) $p_{min}/f$ | $5.62 \times 10^{-3}$ | $3.39 \times 10^{-3}$ | $1.93 \times 10^{-3}$ |
| (9) H (μm) | 1.19 | 1.19 | 1.03 |

TABLE 7B

DESIGN CONDITIONS FOR WORKING EXAMPLES 4–6

| DESIGN CONDITION | WE4 | WE5 | WE6 |
|---|---|---|---|
| (1) RSA | −0.002 | −0.009 | −0.004 |
| (2) LA | 0.0008 | 0.0008 | −0.0007 |
| (3) $LA_R$ | 0.017 | 0.039 | 0.030 |
| (4) $LA_D$ | −0.016 | −0.039 | −0.037 |
| (5) $f_{DOE}/f$ | 36.7 | 28.4 | 25.1 |
| (6) h/y | 0.000 | 0.000 | 0.000 |
| (7) $n_p$ | 1.629869 | 1.760293 | 1.76624 |
| (8) $p_{min}/f$ | $2.41 \times 10^{-3}$ | $3.42 \times 10^{-3}$ | $2.36 \times 10^{-3}$ |
| (9) H (μm) | 1.19 | 1.03 | 1.03 |

As can be seen from the aberration plots corresponding to the Working Examples 1–6, the imaging optical system in each Working Example has a wide field-angle and superior imaging performance over a wide wavelength range from 400–850 nm.

As described above, by appropriately combining a refractive optical element and a diffractive optical element according to the present invention, an imaging optical system for use at finite distances is obtained wherein various aberrations are satisfactorily corrected after correcting axial chromatic aberration and transverse chromatic aberration over a wide wavelength range extending from the visible region to the infrared region in the vicinity of 850 nm. Moreover, the imaging optical system has a large field-angle of 20° or greater.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. An imaging optical system having a focal length f and a maximum imagewise numerical aperture and comprising, objectwise to imagewise along an optical axis:
    a) a front lens group having at least one refractive optical element;
    b) a diffractive optical element provided with a diffractive surface having positive diffractive power and a focal length $f_{DOE}$;
    c) a rear lens group having at least one refractive optical element; and
    d) wherein RSA is an amount of spherical aberration at the maximum imagewise numerical aperture, as measured with respect to e-line wavelength light, in the limit as said positive diffractive power approaches zero, wherein LA is a maximum amount of axial chromatic aberration of said imaging optical system over a wavelength range of 400–850 nm as measured with respect to e-line reference wavelength light, and wherein the following conditions are satisfied:

$0.01<RSA/f<0.01$ (1)

$-0.002<LA/f<0.002.$ (2)

2. An imaging optical system according to claim 1, wherein:
    a) said front lens group has at least one positive lens and, imagewise of said positive lens, at least one negative lens having an imagewise concave surface; and
    b) said rear lens group has at least one positive lens and, objectwise of said positive lens, at least one negative lens having an objectwise concave surface.

3. An imaging optical system according to claim 1, further satisfying the following conditions:

$0<LA_{Rs}/f<0.1$ (3)

$-0.1<LA_{Ds}/f<0$ (4)

wherein $LA_{Rs}$ is an amount of s-line axial chromatic aberration of the imaging optical system, as measured with respect to an e-line reference wavelength light in the limit as said diffractive power of said diffractive surface approaches zero, $LA_{Ds} \equiv LA_s - LA_{Rs}$, and $LA_s$ is an amount of s-line axial chromatic aberration of the imaging optical system, as measured with respect to e-line reference wavelength light.

4. An imaging optical system according to claim 2, further satisfying the following conditions:

$0<LA_{Rs}/f<0.1$ (3)

$-0.1<LA_{Ds}/f<0,$ (4)

wherein $LA_{Rs}$ is an amount of s-line axial chromatic aberration of the imaging optical system, as measured with respect to e-line reference wavelength light, in the limit as said diffractive power of said diffractive surface approaches zero, $LA_{Ds} \equiv LA_s - LA_{Rs}$, and $LA_s$ is an amount of s-line axial chromatic aberration of the imaging optical system, as measured with respect to e-line reference wavelength light.

5. An imaging optical system according to claim 1, further satisfying the following condition:

$10<f_{DOE}/f<100.$ (5)

6. An imaging optical system according to claim 3, further satisfying the condition:

$10<f_{DOE}/f<100.$ (5)

7. An imaging optical system according to claim 1, further satisfying the condition:

$-0.1<h/y<0.1,$ (6)

wherein h is a maximum incident height of a principal ray impinging on said diffractive surface of the diffractive optical element, and y is a maximum image height.

8. An imaging optical system according to claim 2, further satisfying the condition:

$-0.1<h/y<0.1,$ (6)

wherein h is a maximum incident height of a principal ray impinging on said diffractive surface of the diffractive optical element, and y is a maximum image height.

9. An imaging optical system according to claim 3, further satisfying the condition:

$-0.1<h/y<0.1,$ (6)

wherein h is a maximum incident height of a principal ray impinging on said diffractive surface of the diffractive optical element, and y is a maximum image height.

10. An imaging optical system according to claim 5, further satisfying the condition:

$-0.1<h/y<0.1,$ (6)

wherein h is a maximum incident height of a principal ray impinging on said diffractive surface of the diffractive optical element, and y is a maximum image height.

11. An imaging optical system according to claim 1, wherein the imaging optical system includes one or more positive lenses, the system further satisfying the condition:

$n_p>1.6,$ (7)

wherein $n_p$ is an average refractive index value of said one or more positive lenses.

12. An imaging optical system according to claim 3, wherein the imaging optical system includes one or more positive lenses, the system further satisfying the condition:

$n_p>1.6,$ (7)

wherein $n_p$ is an average refractive index value of said one or more positive lenses.

13. An imaging optical system according to claim 5, wherein the imaging optical system includes one or more positive lenses, the system further satisfying the condition:

$n_p>1.6,$ (7)

wherein $n_p$ is an average refractive index value of said one or more positive lenses.

14. An imaging optical system according to claim 7, wherein the imaging optical system includes one or more positive lenses, the system further satisfying the condition:

$$n_p > 1.6, \quad (7)$$

wherein $n_p$ is an average refractive index value of said one or more positive lenses.

15. An imaging optical system according to claim 1, wherein said diffractive optical element has a minimum radial pitch $p_{min}$ and a height H, and wherein at least one of the following conditions is satisfied:

$$1 \times 10^{-3} < p_{min}/f < 9 \times 10^{-3} \quad (8)$$

$$0.5 \, \mu m < H < 1.5 \, \mu m. \quad (9)$$

16. An imaging optical system according to claim 3, wherein said diffractive optical element has a minimum radial pitch $p_{min}$ and a height H, and wherein at least one of the following conditions is satisfied:

$$1 \times 10^{-3} < p_{min}/f < 9 \times 10^{-3} \quad (8)$$

$$0.5 \, \mu m < H < 1.5 \, \mu m. \quad (9)$$

17. An imaging optical system according to claim 5, wherein said diffractive optical element has a minimum radial pitch $p_{min}$ and a height H, and wherein at least one of the following conditions is satisfied:

$$1 \times 10^{-3} < p_{min}/f < 9 \times 10^{-3} \quad (8)$$

$$0.5 \, \mu m < H < 1.5 \, \mu m. \quad (9)$$

18. An imaging optical system according to claim 7, wherein said diffractive optical element has a minimum radial pitch $p_{min}$ and a height H, and wherein at least one of the following conditions is satisfied:

$$1 \times 10^{-3} < p_{min}/f < 9 \times 10^{-3} \quad (8)$$

$$0.5 \, \mu m < H < 1.5 \, \mu m. \quad (9)$$

19. An imaging optical system according to claim 11, wherein said diffractive optical element has a minimum radial pitch $p_{min}$ and a height H, and wherein at least one of the following conditions is satisfied:

$$1 \times 10^{-3} < p_{min}/f < 9 \times 10^{-3} \quad (8)$$

$$0.5 \, \mu m < H < 1.5 \, \mu m. \quad (9)$$

\* \* \* \* \*